United States Patent [19]

Faltermeier et al.

[11] Patent Number: 4,790,663

[45] Date of Patent: Dec. 13, 1988

[54] PHOTOMETER TUBE FOR MICROSCOPES

[75] Inventors: Bernd Faltermeier, Aalen; Martin Laudenberger, Murrhardt, both of Fed. Rep. of Germany

[73] Assignee: Carl-Zeiss-Stiftung, Heidenheim/Brenz, Fed. Rep. of Germany

[21] Appl. No.: 109,956

[22] Filed: Oct. 19, 1987

[30] Foreign Application Priority Data

Oct. 28, 1986 [DE] Fed. Rep. of Germany ..... 36366616

[51] Int. Cl.⁴ .......................... G02B 21/18; G01J 1/42
[52] U.S. Cl. .................................... 356/432; 356/218; 356/219; 356/225
[58] Field of Search ............... 356/432, 445, 218, 219, 356/225

[56] References Cited

U.S. PATENT DOCUMENTS 3,887,283  6/1975  Merstallinger et al. ............ 356/225
4,269,517  5/1981  Sawamura et al. ................ 356/432

Primary Examiner—Vincent P. McGraw
Attorney, Agent, or Firm—Stonebraker, Shepard & Stephens

[57] ABSTRACT

A photometer tube for a microscope contains several switchable reflectors (5, 11). By the appropriate use of these, the ray path (c) for the back-illuminated measuring field stop (7) is reflected out of the photometry ray path (b) and is conducted to a second image inlet (32) of a beam splitter prism or prism slide. Various switchable elements (mirrors 5 and 11; stop 4; prism 2/22) in the tube are electrically driven and are centrally actuated from a control unit.

6 Claims, 2 Drawing Sheets

PHOTOMETER TUBE FOR MICROSCOPES

BACKGROUND OF THE INVENTION

This invention relates to a photometer tube for a microscope. Such tubes, as known up to the present time, may be classified into two types.

Tubes of the first type are those in which, in order to visualize the measuring field stop, the entire observation ray path is conducted through what may be called a bypass loop and is reflected at an obliquely positioned measuring field stop, which is usually developed as a concave mirror. Such instruments are described, for example, in Federal Republic of Germany patent document No. 24 06 415 and its corresponding U.S. Pat. No. 3,887,283 of Merstallinger et al., granted June 3, 1975, and in Fed. Rep. Germany patent document No. 32 03 142 and its corresponding U.S. Pat. No. 4,518,230 of Weber, granted May 21, 1985, and in Fed. Rep. Germany patent document No. 32 13 145 and its corresponding U.S. Pat. No. 4,568,188 of Weber et al., granted Feb. 4, 1986.

In instruments of this first type, it is difficult to make the measuring field stop variable, and difficult to illuminate it. Moreover, instruments with bypass loops have the disadvantage that, because of the length of the observation ray path, there comes into being a post-magnification factor, which results in a darker image. This interferes particularly with the observation of objects which fluoresce with low intensity.

Referring again to the above mentioned two types of instruments, in those of the second type the observation ray path is deflected by a beam splitter directly into the eyepiece tube. The image of a back-illuminated measuring field stop is superimposed on an intermediate image produced in the eyepiece tube because of the fact that the auxiliary ray path for the imaging of the measuring field stop is led coaxially backward to the photometry ray path and, with the help of a retroreflector arranged behind the second outlet of the beam-splitter prism, is reflected into the eyepiece tube. Instruments of this type are described, for example, in Feb. Rep. Germany patent No. 1,215,954 of Weber, granted Nov. 17, 1966, and in Swiss patent No. 615,762 and its corresponding British patent No. 1,582,346 of Leitz, published Jan. 7, 1981, and in Fed. Rep. Germany patent document No. 34 43 728 and its corresponding European patent application No. 85308145.3 of Schindl, published in English on June 4, 1986, as publication No. 0 183 416.

Instruments of this second type have the possibility of making the measuring field stop interchangeable, and of illuminating it in a simple way. However, they also have the disadvantage that the light required for illuminating the measuring field stop gives rise to reflections in the image space, that is, on the tube lens, on the objective, or on other optical elements in the viewing ray path. These reflections are disturbingly superimposed on the image of the object.

Fed. Rep. Germany Auslegeschrift No. 1,813,499 of Voss, published Oct. 11, 1973, discloses a photometer tube in which the viewing ray path is reflected directly into the eyepiece by means of a first beam splitter, and in which the light passing through the measuring field stop is led around a bypass loop and, by means of a second beam splitter, is again superimposed on the viewing ray path. A disadvantage of this solution is that it supplies only a rather dim image of the measuring field stop, because of the arrangement of several beam splitters, one after another, through which the light must travel.

It is the object of the present invention to provide an improved photometer tube for a microscope, which will supply an intermediate image with the measuring field stop visible therein with the greatest brightness possible and with the greatest possible freedom from undesirable reflections.

SUMMARY OF THE INVENTION

This object is achieved in accordance with the invention by providing a prism or a prism slide having means to split the light coming from the microscope objective into a viewing ray path and a photometry ray path, and means for reflecting an image of the measuring field stop into the viewing ray path, the imaging ray path for the back-illuminated measuring field stop extending in part coaxial to the photometry ray path. Also there is a switchable (i.e., movable or shiftable) reflector by means of which the imaging ray path c for the measuring field stop is separated from the photometry ray path b and is led to the second image inlet of the prism or the prism slide, as the case may be. The term "prism means" as used hereafter in this description and in the claims is intended to include either a prism or a prism slide.

By this measure, as in instruments of the above mentioned second type, a flat unsilvered measuring field stop can be employed, arranged perpendicular to the optical axis of the photometry ray path and therefore easily interchangeable. Reflections from the illumination of the measuring field stop are avoided because the auxiliary ray path for the back-illuminated measuring field stop does not enter the splitter prism coaxially to the photometry ray path, but enters a second inlet of the splitter prism after deflection. Moreover, a bright intermediate image is produced, because the viewing ray path is not conducted over bypass loops.

The solution in accordance with the invention thus combines the advantages of both of the above mentioned design types without having their specific disadvantages above pointed out.

It is advisable to provide a further switchable reflector by means of which the back-illumination of the measuring field stop may be selectively reflected into the photometry ray path.

It is also advantageous to use motor means to switch this second reflector, and the switchable first reflector for the reflecting out of the measuring field stop ray path, and the splitter prism, and it is advisable to couple these several motor drives with a control unit which contains a computer memory for the positions of the reflectors or splitter prism which are to be combined with one another in the various switch positions "Observation" and "Photometry" and possibly also "Photography" or "TV."

Further advantageous developments of the invention will become evident from the following description of a preferred examplary embodiment of the invention read in conjunction with the accompanying drawings.

DETAILED DESCRIPTION

Figure 1:
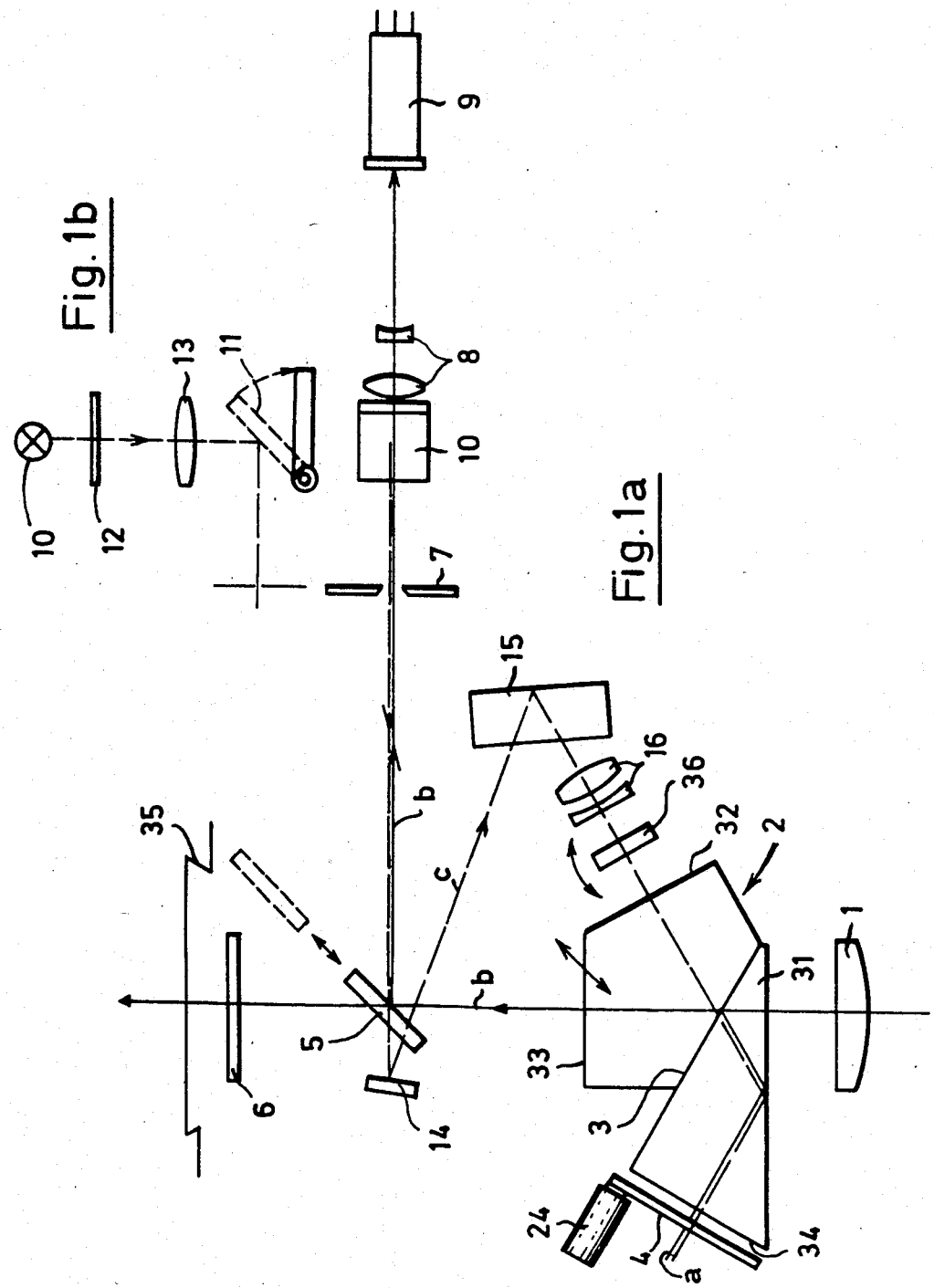
FIG. 1a is a basic schematic diagram of the entire ray path in a photometer tube according to a preferred embodiment of the invention.
FIG. 1b is a basic schematic diagram of a portion of the illuminating ray path for illuminating the measuring field stop.

Referring first to FIG. 1a, the tube lens is indicated at 1. Below this lens is the conventional objective (not shown) of a conventional microscope. This tube lens 1 produces an intermediate image of the object on which the microscope objective is focused.

Above the tube lens 1 is a splitter prism 2 which has a first image inlet 31, a second inlet 32, a first image exit surface 34, and a second exit 33. The light coming up from the objective through the tube lens 1 enters the prism 2 at the surface 31 and is split into a viewing ray path a which passes through the first exit 34, and a photometry ray path b which passes through the second exit 33.

The first outlet or exit surface 34 of the splitter prism 2 faces the conventional eyepiece (not shown) of the microscope. In front of this outlet 34 is a pivoted stop 4 which may be swung between a closed position and an open position. In the "Photometry" switched position, this stop 4 is closed and prevents spurious or stray light from penetrating through the eyepiece into the photometer ray path. During the viewing and selection of the region to be subjected to photometry, the stop 4 may be swung aside by an electric motor 24 to the "Observation" position, so that the observation rays may exit through the outlet surface 34 and enter the usual eyepiece of the microscope.

The partial ray path b for photometry, transmitted through the splitter surface 3 of the splitter prism 2, passes out through the second image outlet or exit surface 33 and continues to a mirror 5, where it is deflected toward the measuring field stop 7, which is arranged in an intermediate image plane.

The measuring field stop is followed by a lens system schematically indicated at 8, which serves to image the pupil of the objective on the cathode of a photomultiplier 9 or on the inlet slit of an interposed monochromator.

The prism 2 is arranged on a slide on which is also mounted a second prism 22 (FIG. 2) with a different splitting factor. The slide may be switched, e.g., by operation of an electric motor 23, to bring either one of the two splitter prisms into operative position in the optical axis of the microscope. In the specific example here disclosed, the first prism 2 splits the light coming from the objective in the ratio of 90/10, that is, it reflects 10 percent of the light into the viewing ray path a. This is the prism that is normally in effective operating position during "Photometry" operation. The second prism 22, shifted into operative position in the "Observation" switch setting, has a transmission factor of 0.1 so that it reflects 90 percent of the incident light into the viewing ray path a.

In order to make the measuring field stop 7 visible, there is a light source 10 (FIG. 1b) with a diffusing disk 12 and a collimator lens 13. The light bundle produced by these elements is reflected into the photometry ray path b by means of a swingable mirror 11 arranged between the measuring field stop 7 and the lens system 8. In the "Observation" switch setting, the swingable mirror 11 is in the inclined position shown in broken lines and serves to direct light from the light source to the back of the measuring field stop, which is thus illuminated from behind. Simultaneously, the switchable mirror 5 is shifted from its position shown in full lines to the position shown in broken lines, so that the light passing through the measurinmg field stop 7 reaches a further reflecting mirror 14 which is not utilized during the "Photometry" switch setting. The mirror 14 reflects the light passing through the measuring field stop 7 toward a 90 degree prism 15. From there, the light is led to the second inlet 32 of the splitter prism 2.

There is a lens system schematically indicated at 16 arranged in the partial ray path c between the 90 degree prism 15 and the second inlet 32 of the splitter prism. This lens system images the measuring field stop 7 in the intermediate image plane in the viewing ray path a, that is, in the eyepiece tube. Hence the image of the object which is produced in the eyepiece tube has superimposed on it the image of the brightly illuminated measuring field stop 11. The image of the measuring field stop 7 can be precisely adjusted relative to the object image with the help of a flat plate 36 which is tiltable in two directions and which is located in front of the second image inlet 32 of the prism 2.

Above the switchable mirror 5 there is a closure plate 6 in front of a mounting dovetail 35 on which a television camera or a photographic camera may be mounted. The light transmitted by the splitter layer 3 in the splitter prism (2 or 22, as the case may be) arrives at the television camera or photographic camera mounted on the dovetail mount, when the mirror 5 is swung out to its "Observation" position illustrated in broken lines.

Figure 2:
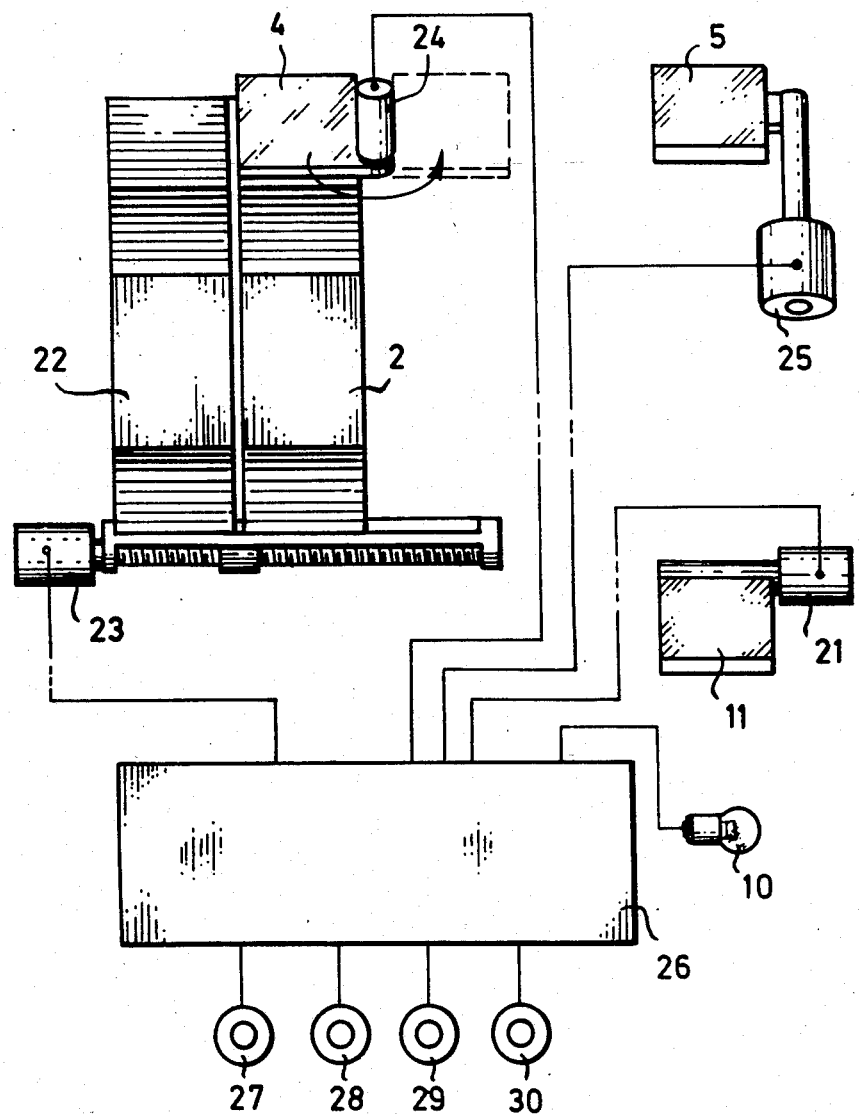
FIG. 2 is a schematic diagram of portions of the apparatus, illustrating especially the drives for the switchable elements.

Referring to FIG. 2, the drive 23 for the prism slide, and the drive 24 for the shiftable stop 4 in the viewing path, and the drive 25 for the swingable mirror 5, and the drive 21 for the deflecting mirror 11, and the incandescent bulb 10 for illuminating the measuring field stop, are all jointly connected to a control device or unit 26.

In the "memory" of this control device 26 are stored the corresponding positions or switching states of the five components just mentioned, for the three respective operating modes "Observation" and "Photometry" and "TV/Photography." These three modes can be called up as desired, by actuation of the appropriate one of the three respective buttons or switches 27, 28, and 29. A fourth input button or switch 30 is also provided, with which the user can call up a switch combination appropriate to his needs, which he himself has previously entered or programmed into the memory bank of the control device. A switch combination defined by the user himself might, for example, provide for a TV representation of the object with a reflected measuring field stop in the TV picture.

For ease of understanding, the positions or switching states are summarized in the following table.

| Mode | Prism | Stop 4 | Mirror 5 | Mirror 11 | Lamp 10 |
|---|---|---|---|---|---|
| Observation | 22 | out | out | in | in |
| Photometry | 2 | in | in | out | out |
| TV/Photo (without measuring field) | 2 | out | out | out | out |
| TV/Photo (with measuring field) | 2 | out | out | in | in |

In the description up to this point, it has been assumed that the mirror 5 is a totally reflecting mirror. When this is the case, it is not possible simultaneously to perform photometry and to depict the object with, for example, a TV camera on the mount 35, because a totally reflecting mirror 5 allows only one or the other mode of operation. However, it is possible to provide simultaneous TV depiction during photometry if the mirror 5 is made as a beam splitting mirror, or if a swingable beam splitter is provided at this point, to be optionally swung into effective position to replace the totally reflective mirror 5 when desired.

What is claimed is:

1. A photometer tube for a microscope, said photometer tube including prism means having a first image inlet and a second image inlet, a measuring field stop, means providing a back-illumination ray path for back-illumination of said measuring field stop, means for directing light from a microscope objective into said first image inlet of said prism means, said prism means including means for splitting light entering said first image inlet into a viewing ray path (a) and a photometry ray path (b), means for reflecting an image of said measuring field stop into said viewing ray path, reflection of said image of said measuring field stop being along a ray path extending in part coaxial to an axis of said photometry ray path (b), and a first switchable reflector (5) effective in one position to separate a portion of said ray path of said measuring field stop from said photometry ray path and to direct it along a ray path (c) to said second image inlet (32) of said prism means.

2. A photometer tube as defined in claim 1, further comprising imaging optics (16) for providing an image of said measuring field stop at a location to be observed by an observer, said imaging optics being located at least in part at a location in said ray path (c) between said first switchable reflector (5) and said second image inlet (32) of said prism means.

3. A photometer tube as defined in claim 1, comprising a second switchable reflector (11) for reflecting said back-illumination ray path into said photometry ray path (b).

4. A photometer tube as defined in claim 3, further comprising first motor means (25) for shifting said switchable reflector (5), second motor means (21) for shifting said second switchable reflector (11), third motor means (23) for shifting said prism means (2, 22) between a position providing one beam splitting ratio and a position providing a different beam splitting ratio, a control unit (26), and means operatively connecting said first, second, and third motor means to said control unit to be controlled thereby.

5. A photometer tube as defined in claim 4, wherein said control unit includes memory means for controlling operation of said motor means to provide proper respective settings of said first switchable reflector, said second switchable reflector, and said prism means appropriate for use of said photometer tube in Observation mode or in Photometry mode, respectively.

6. A photometer tube as defined in claim 1, wherein said first switchable reflector (5) is partially transmitting.

* * * * *